United States Patent
O'Connor

(10) Patent No.: US 9,178,998 B2
(45) Date of Patent: Nov. 3, 2015

(54) SYSTEM AND METHOD FOR RECORDING CALLS IN A WEBRTC CONTACT CENTER

(71) Applicant: Avaya Inc., Basking Ridge, NJ (US)

(72) Inventor: Neil O'Connor, Galway (IE)

(73) Assignee: Avaya Inc., Basking Ridge, NJ (US)

(*) Notice: Subject to any disclaimer, the term of this patent is extended or adjusted under 35 U.S.C. 154(b) by 0 days.

(21) Appl. No.: 13/795,392

(22) Filed: Mar. 12, 2013

(65) Prior Publication Data
US 2014/0270104 A1    Sep. 18, 2014

(51) Int. Cl.
*H04M 3/51* (2006.01)
*H04M 3/42* (2006.01)
*H04M 1/656* (2006.01)

(52) U.S. Cl.
CPC ........ *H04M 3/5175* (2013.01); *H04M 3/42221* (2013.01); *H04M 3/5191* (2013.01); *H04M 1/656* (2013.01)

(58) Field of Classification Search
CPC ... H04M 1/65; H04M 1/656; H04M 3/42221; H04M 3/4938
USPC ............................... 379/88.17, 265.01–266.1
See application file for complete search history.

(56) References Cited

U.S. PATENT DOCUMENTS

| | | | |
|---|---|---|---|
| 6,047,060 A * | 4/2000 | Fedorov et al. | 379/265.02 |
| 7,433,459 B2 * | 10/2008 | Reding et al. | 379/265.09 |
| 8,165,874 B2 * | 4/2012 | Kurata et al. | 704/233 |
| 2008/0298253 A1 * | 12/2008 | Walker et al. | 370/241 |
| 2009/0185673 A1 * | 7/2009 | Erhart et al. | 379/265.09 |
| 2014/0072115 A1 * | 3/2014 | Makagon et al. | 379/265.09 |
| 2014/0126708 A1 * | 5/2014 | Sayko | 379/93.01 |

OTHER PUBLICATIONS http://www.slideshare.net/ReidStidolph/webrtc-vs-voip-iitrtc-oct-2013 "WebRTC vs. VoIP—What's New? What's Different"; Oracle. Wikipedia, the free encyclopedia "WebRTC"; http://en.wikipedia.org/wiki/WebRTC; three (3) pages, Jan. 21, 2014.

* cited by examiner

*Primary Examiner* — Simon Sing
(74) *Attorney, Agent, or Firm* — Maldjian Law Group LLC

(57) ABSTRACT

A call recording system for recording WebRTC calls between a user and an agent of an enterprise is provided. The call recording system includes a monitor module for monitoring and detecting at least one request to establish WebRTC call with an agent of the enterprise. The call recording system includes a fork module for forking media streams associated with the at least one WebRTC call. The call recording system further includes a record module for recording the forked media streams to record the at least one WebRTC call. The call recording system further includes a barge module for enabling a supervisor to barge into the at least one WebRTC call.

20 Claims, 5 Drawing Sheets

SYSTEM AND METHOD FOR RECORDING CALLS IN A WEBRTC CONTACT CENTER

BACKGROUND

1. Field of the Invention

Embodiments of the present invention generally relate to a system and method for recording calls of an enterprise and particularly to a system and method for recording calls between a customer and an agent of the enterprise communicating over WebRTC enabled browsers.

2. Description of Related Art

In context of a call center enterprise, the ability to record all calls between customer and an agent is crucial. Many businesses will not deploy a call center unless it has call recording. Typically, the recording of the call conversation is done by redirecting media streams associated with the call to a media server and sending the media stream to memory and/or database of an enterprise to record the media. However, the advent of WebRTC-enabled browsers opens new opportunities and challenges for call center applications. One of the opportunities is the ease with which hot desking and mobile agents, i.e., agent may be anywhere, may be facilitated. It is designed to make point-to-point calls, but there is no provision for call recording. Further, to ensure all call conversations are recorded, it is possible to anchor all calls within the call center enterprise. But this approach tends to be moderately complex and may require a lot of centralized resources, media servers, and constant capability. Scaling up involves adding media servers or gateways because this device sends additional RTP, i.e., Real-time Transport Protocol, streams to the call recording application.

Additionally, call recording in a network environment may provide issues such as, larger amount of network bandwidth may be utilized while redirecting the media streams to the media servers, and deployment of number of media servers may increase installation and maintenance cost.

There is thus need for a contact center for recording calls between a customer and an agent of an enterprise communicating over WebRTC enabled browsers.

SUMMARY

Embodiments in accordance with the present invention provide a call recording system for recording WebRTC calls between a user and an agent of an enterprise is provided. The call recording system includes a monitor module for monitoring and detecting at least one request to establish WebRTC call with an agent of the enterprise. The call recording system includes a fork module for forking media streams associated with the at least one WebRTC call. The call recording system further includes a record module for recording the forked media streams to record the at least one WebRTC call. The call recording system further includes a barge module for enabling a supervisor to barge into the at least one WebRTC call.

Embodiments in accordance with the present invention further provide a computer-implemented method for recording calls in an enterprise. The computer-implemented method includes monitoring incoming call requests in an enterprise to detect at least one request to establish WebRTC call with an agent of the enterprise, forking media streams associated with the at least one WebRTC call, and recording the forked media streams to record the at least one WebRTC call.

Embodiments in accordance with the present invention further provide a computer readable medium storing computer readable instructions when executed by a processor perform a method. The method includes monitoring incoming call requests in an enterprise to detect at least one request to establish WebRTC call with an agent of the enterprise, forking media streams associated with the at least one WebRTC call, and recording the forked media streams to record the at least one WebRTC call.

The present invention can provide a number of advantages depending on a particular configuration. First, the present invention enables recording of calls between an agent of an enterprise and a user communicating over WebRTC enabled browsers. Conventionally, Web RTC enabled browsers are designed to make point-to-point calls. However, as discussed above, call recording is very crucial in contact centers. Hence, the present invention utilizes forking capability of WebRTC enabled browser, for recording calls between the agent of the enterprise and the user communicating over WebRTC enabled browsers.

Next, the present invention promotes mobile agents, i.e. agents anywhere. The agent of the call center can get free from hot desking and can assist the customers from a remote location, by directly exploiting WebRTC feature within the agent's browser. The present invention also provides a scalable enterprise or contact centers, as by utilizing the present invention, the enterprise can have agents throughout the world.

Further, present invention disaggregates overhead of the call recordings among the agents. So, the call recording capacity scales up along with the addition of new agents to the call center. The present invention does not require installation of centralized resources, or media servers everywhere that hosts as an anchor point for call recording.

Furthermore, the present invention optimizes bandwidth utilization. The web server forks the media stream towards a call recording application which creates web files out of them to optimize bandwidth utilization. Moreover, a supervisor of the call center may also interfere in the call and observes the call. The supervisor may hook into that call, and may take the call away from that agent of the contact center based on proceeding of the call.

These and other advantages will be apparent from the disclosure of the invention(s) contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
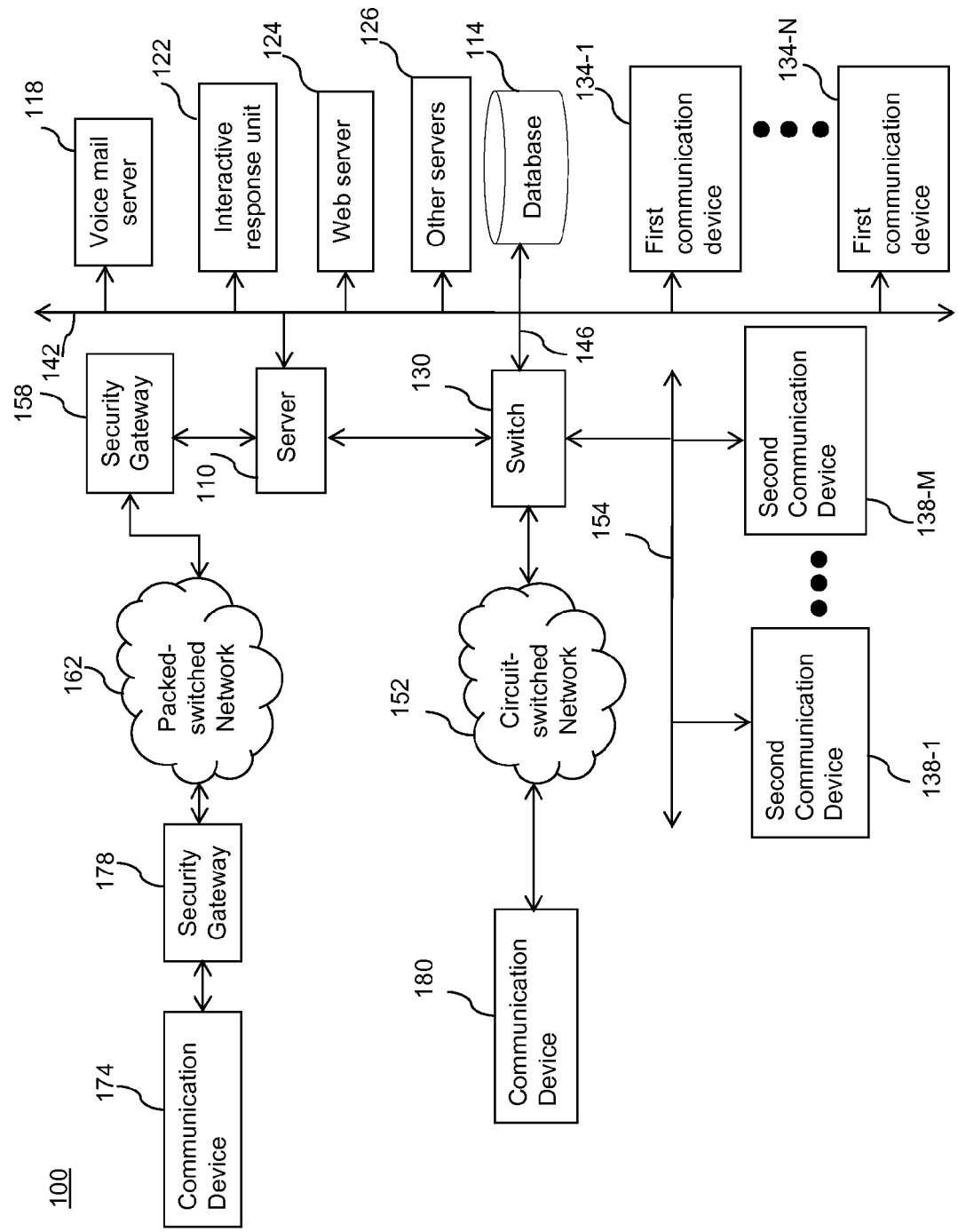
FIG. 1 is a block diagram depicting a contact center according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The present invention will be illustrated below in conjunction with an exemplary communication system. Although well suited for use with, e.g., a system having an ACD or other similar contact processing switch, the present invention is not limited to any particular type of communication system switch or configuration of system elements. Those skilled in the art will recognize that the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

FIG. 1 shows an illustrative embodiment of the present invention. A contact center 100 comprises a server 110, a set of data stores or databases 114 containing media streams of call conversation, and a plurality of servers, namely a voice mail server 118, an Interactive Response Unit (e.g., IVR) 122, a web server 124 and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers may be connected via optional communication lines 146 to the switch 130. As will be appreciated, the other servers 126 may also include a scanner (which is normally not connected to the switch 130 or server 110), VoIP software, video call software, voice messaging software, an IP voice server, a fax server, an email server, and the like. The switch 130 is connected via a plurality of trunks 150 to the Public Switch Telephone Network or PSTN 152 and via link(s) 154 to the second communication devices 138-1 to M. A security gateway 158 is positioned between the server 110 and a packet-switched network 162 to process communications passing between the server 110 and the packet-switched network 162.

Although the preferred embodiment is discussed with reference to client-server architecture, it is to be understood that the principles of the present invention apply to other network architectures. For example, the present invention applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the invention does not require the presence of packet- or circuit-switched networks.

Figure 2:
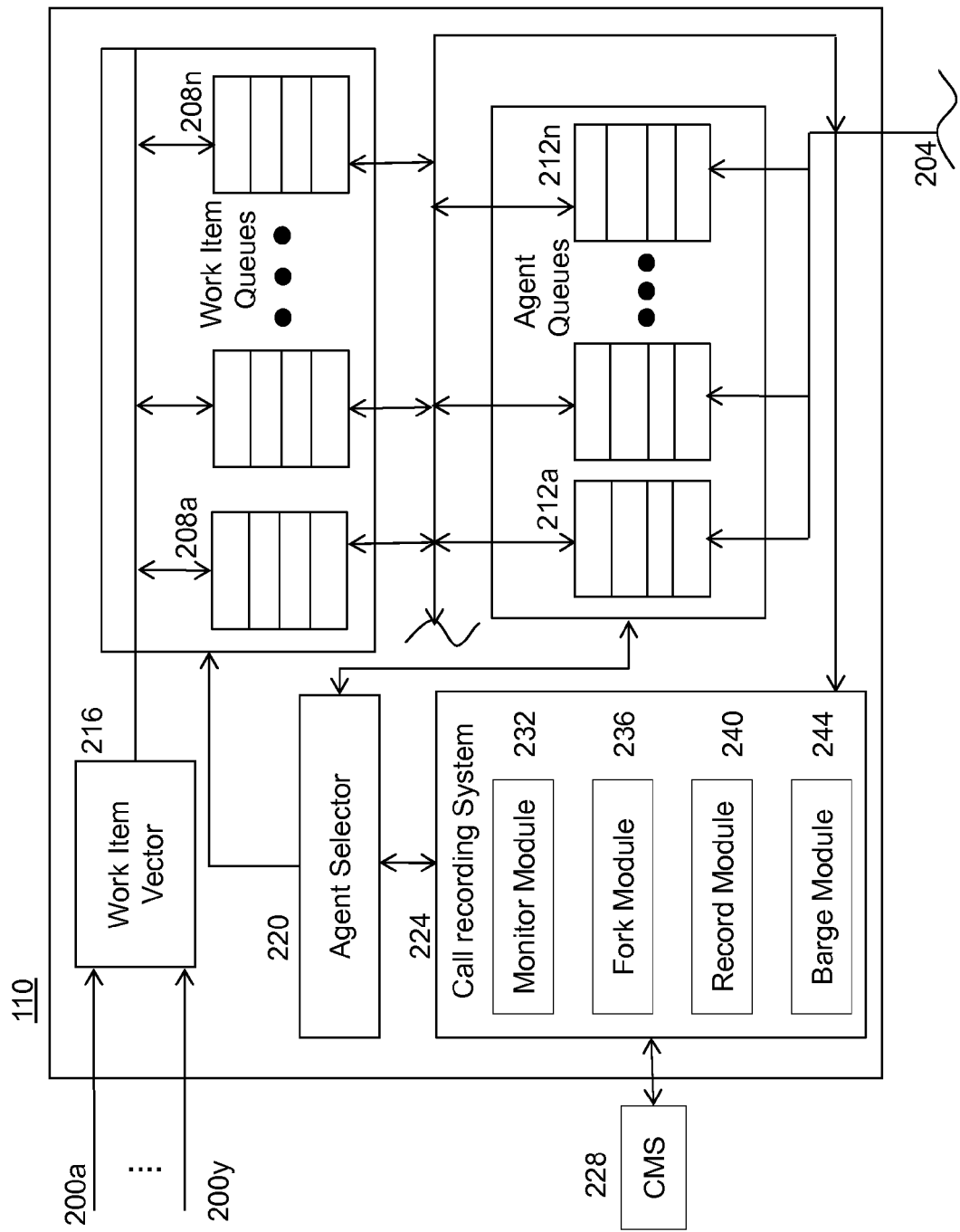
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include Avaya Inc.'s an Operational Analyst™ with On-Line Analytical processing, or OLAP technology or a Call management System or CMS 228 that gathers call records and contact-center statistics for use in generating contact-center reports. OA and CMS will hereinafter be referred to jointly as CMS 228.

The switch 130 and/or server 110 may be any architecture for directing contacts to one or more communication devices. In some embodiments, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX)-based ACD system, Multi-Vantage™ PBX, Communication Manager™, S8300™ media server and any other media servers, SIP Enabled Services™, Intelligent Presence Server™, and/or Avaya Interaction Center™, and any other products or solutions offered by Avaya or another company.

Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

As can be seen in FIG. 2, included among the data stored in the server 110 is a set of contact queues 208a-n and a separate set of agent queues 212a-n. Each contact queue 208a-n corresponds to a different set of agent queues, as does each agent queue 212a-n. Conventionally, contacts are prioritized and either is enqueued in individual ones of the contact queues 208a-n in their order of priority or is enqueued in different ones of a plurality of contact queues that correspond to a different priority. Likewise, each agent's queues are prioritized according to his or her level of expertise or skill in that queue, and either agents are enqueued in individual ones of agent queues 212a-n in their order of expertise level or are enqueued in different ones of a plurality of agent queues 212a-n that correspond to a queue and each one of which corresponds to a different expertise level.

Included among the control programs in the server 110 is a work item vector 216. Contacts incoming to the contact center are assigned by work item vector 216 to different work item queues 208a-n based upon a number of predetermined criteria, including customer identity, customer needs, contact center needs, current contact center queue lengths, customer value, and the agent skill that is required for the proper handling of the contact. Agents who are available for handling work items are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

Referring again to FIG. 1, the security gateway 158 may be implemented as hardware such as via an adjunct processor (as shown) or as a chip in the server.

The first communication devices 134-1, . . . 134-N are packet-switched and may include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1, . . . 138-M are circuit-switched. Each of the communication devices 138-1 . . . 138-M corresponds to one of a set of internal extensions Ext1, . . . ExtM, respectively. The second communication devices may include, for example, wired and wireless telephones, PDAs, H.320 videophones and conferencing units, voice messaging and response units, and any other communication device.

It should be noted that the invention does not require any particular type of information transport medium between switch, or server and first and second communication devices, i.e., the invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 is in communication with a first communication device 174 via a security gateway 178, and the circuit-switched network 152 with an external second communication device 180.

In a preferred configuration, the server 110, network 162, and first communication devices 134 are Session Initiation Protocol or SIP compatible and may include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the server 110 is notified via LAN 142 of an incoming work item by the communications component (e.g., switch 130, fax server, email server, web server, and/or other server) receiving the incoming work item. The incoming work item is held by the receiving telecommunications component until the server 110 forwards instructions to the component to forward or route the contact to a specific contact center resource, such as the IVR unit 122, the voice mail server 118, web server 124 and/or first or second telecommunication device 134, 138 associated with a selected agent. The server 110 distributes and connects these work items to telecommunication devices of available agents.

Depending on the contact center configuration, the central server may forward a list of work items to an available agent to preview before forwarding the work item itself and the data associated therewith to the agent. The agents process the work items or contacts sent to them by the server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to embodiments of the present invention, included among the programs executing on the server 110 are an agent and work item selector 220 and a call recording system 224. The agent selector 220 and the call recording system 224 are stored either in the main memory or in a peripheral memory (e.g., disk, CD ROM, etc.) or some other computer-readable medium of the call center 100. The agent selector 220 effects an assignment between available work items (or contacts) and available agents in a way that tends to maximize contact center efficiency for the current contact center state. The agent selector 220 uses predefined criteria in selecting an appropriate agent to service the work item. The selector 220, in particular, obtains, for each of a plurality of contact center goals or objectives, status information, or information respecting whether or not a corresponding goal (for example, the service level agreement) is being met or unmet and/or a level to which the corresponding goal is being met or unmet.

For example, exemplary goal levels can be expressed as actual, average or median wait times in each queue 208, actual, average, or median agent staffing levels in each queue 212, actual, average, or median revenue (whether gross or net) realized by a designated set of agents (such as the agents in an agent skill queue) per serviced contact, a customer satisfaction level for a set of designated agents determined during or after servicing of each customer's contact, actual, average, or median time for the agents in a set of designated agents to service contacts, number of contacts to be serviced by a set of designated agents during a selected time period, and the service level agreement between the contractor and the client. This information, along with other statistics is typically gathered by the CMS 228.

Figure 3:
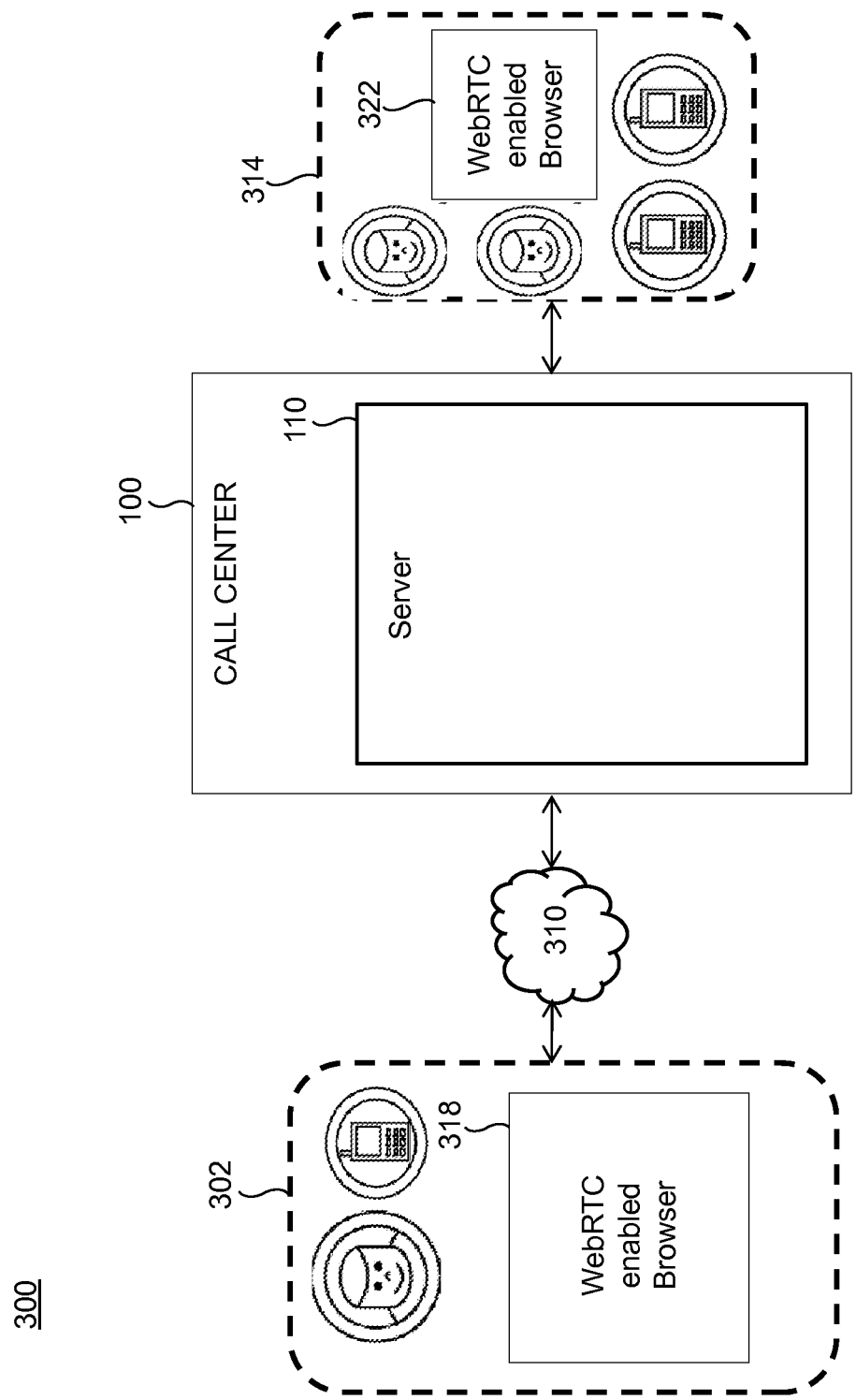
FIG. 3 is an exemplary architecture in which the various embodiments may be implemented in accordance with an embodiment of the present invention.

According to an embodiment of the present invention, a user at the user terminal 302 may use a WebRTC enabled browser 318 for requesting a communication with an agent of the contact center, as shown in FIG. 3. The user at the user terminal 302 may click on a link, and/or an icon on a WebRTC enabled browser to make a request to establish a call with an agent of the contact center 100. The agent of the contact center 100 may use a WebRTC enabled browser 322 for interacting with the user.

The contact center 100 may be configured to support the communication modes described above using a wide variety of devices for the user terminals 302, including devices operating over analog or digital communication channels designed for the delivery of information to users in an audio form, a visual form (including static and dynamic visual elements), or any combination thereof. For example, in some embodiments, the contact center 100 may be configured to support the user terminals 302 consisting of a general purpose computer device connected to the data network, as described above with respect to FIG. 1. Such devices may include a desktop computer, portable computer, personal digital assistant, smartphone, or any other type of appliance or device having access to one or more data networks supporting real-time and/or time-shifted communication modes over such networks. However, the various embodiments are not limited in this regard.

For example the user terminals 302 may be devices supporting real-time and/or time-shifted communications over telephony networks or any other type of communication networks. Such devices may include land-line telephone devices, mobile or cellular telephone devices, videophone devices, and the like. However, the various embodiments are not limited in this regard and any other types of devices may be used for user terminals 302.

Additionally, the architecture 300 may include agent terminals 314 associated with agents of the call and configured for providing customer support service to the customers at the user terminals 302. In particular, the contact center 100 connects and manages the communication link or session between the user terminals 302 and the agent terminals 314. Although the agent terminals 314 are shown in FIG. 3 as being connected to the network 310 via the contact center 100, the various embodiments are not limited in this regard. Rather, in some embodiments, one or more of the agent terminals 314 may be directly connected to the network 310 and may communicate with the contact center 100 via network 310. The agent terminals 314, like the user terminals 302 may be configured to support real-time and/or time-shifted communication modes. Accordingly, the description above regarding the communication modes and devices for the user terminals 302 is equally applicable to the agent terminals 314.

The server 110 of the contact center 100 includes the call recording system 224. WebRTC enabled browsers 318 and 322 are configured to make point to point calls between the agent and the user. The call recording system 224 is configured to utilize media forking capability of the WebRTC enabled browsers for recording the calls between the user and the agent of the enterprise e.g., contact center. Once, the user tries to connect with the agent by clicking on a page of the Web server, the web server 124 is aware of the fact that the user outside has called up this page, has invoked to provide him an agent. The web server also knows about inside of the enterprise, that this communication session is being offered to another WebRTC enabled web browser, at the agent's web browser. The Web server is aware these two end points are in the process of connecting to each other. The call may be a voice call or a video call.

In an embodiment, the Web server may tell the agent browser to start forking that media towards a call recording application. Further, the Web server can inform a supervisor, by putting a pop-up on the supervisor's browser. The supervisor would have a list of sessions in progress. The supervisor may click on one of those sessions, and start listening in to the call between the agent and the user. In an embodiment, the supervisor's desktop may have a bunch of icons, green icons, which go green, when the agent is in a session.

The supervisor's desktop further includes yellow icons, which turn yellow when the agent is not talking to anybody. The supervisor may click on one of those icons, and provide a command to the Web server. The Web server may command the agent browser to fork a stream to the supervisor, and the supervisor can then start listening in on the conversations going on. Further, the supervisor may also barge in, as well, where the agent is actually bumped out of the conversation. For example, if the agent is really messing up on handling the call, the supervisor could barge in. So the agent browser may be told to stop sending media to the customer, and substitute instead the supervisor's media. The supervisor may bump off the agent, and take over the call.

According to an embodiment of the present invention, the call recording system 224 includes a monitor module 232, a fork module 236, a record module 240, and a barge module 244.

The monitor module 232 may monitor details of an incoming call. In an embodiment of the present invention, the monitor module 232 may monitor and detect a request, from a user having WebRTC enabled browser, to establish WebRTC call with an agent of the enterprise, having WebRTC enabled browser, e.g. calls over a WebRTC enabled browser. The user at the user terminal 302 may click on a link, and/or an icon on a WebRTC enabled browser to make a request to establish a call with an agent of the contact center 100. Further, if the call request is made by a caller outside the enterprise through a WebRTC enabled browser, the monitor module 232 may decide to record the call and triggers the fork module 236 and the record module 240 to record the call. The monitor module 232 may also pass the call to a suitable agent having required skills and experience to handle the call and the call gets established between the agent and the customer. In one embodiment of the present invention, monitoring of the call is carried out in a real time environment.

The fork module 236 may fork the media of the established call. In an embodiment of the present invention, the media of the call is forked by an agent's browser. In another embodiment of the present invention, the agent browser is using a WebRTC enabled browser to communicate with customer's browser. In another embodiment of the present invention, the media may include a voice data, or video data. In yet another embodiment of the present invention, the agent's browser may fork call offers, signaling, or media. In yet another embodiment of the present invention, the media fork may contain an offer that identifies supervisor's Uniform Resource Identifier i.e., URI, and a media stack. The agent browser forks mixed media to the supervisor's URI, and then the supervisor may observe the ongoing call.

The record module 240 may record the forked media. In an embodiment of the present invention, the forked media may be forwarded directly to a call recording application. In the call recording application, the forked media is recorded. In another embodiment of the present invention, the forked media is forwarded to a supervisor of the call center 100. An observe module (not shown in the Fig.) enables the supervisor of the contact center 100 to observe and listen to the ongoing call between the customer and the agent. In an embodiment of the present invention, for recording the media, the media fork contains an offer, but the URI of the supervisor is chosen by the call recording application to act as media sink for the ongoing session. The agent browser then sends two streams i.e., incoming customer Real time Transfer Protocol (RTP), and outgoing agent RTP to an Appointment management System (AMS). In this case, the agent of the call center 100 forks two streams of the customer and the agent RTP that may be recorded separately for this call ID. In an embodiment of the present invention, the media fork for call recording may go to the customer and agent browser separately, and then AMS gets the same media but from two different hosts.

The barge module 244 is configured to enable a supervisor to barge-in the ongoing call. In an embodiment of the present invention, the supervisor of the call center 100 is indicated about the ongoing call. The supervisor of the call center 100 may barge-in the ongoing call to handle the call in an efficient way. In another embodiment of the present invention, the supervisor may hook into that call, and may take the call away from that agent of the contact center 100.

In yet another embodiment of the present invention, the call may be directly transferred to the supervisor of the agent. In an embodiment of the present invention, a call transferring module (not shown in the figure) may transfer the call to the supervisor of the agent. In yet another embodiment of the present invention, the supervisor may also interfere in the call if the call is going really well. This may be done to observe the call by the supervisor and record the ongoing call.

Figure 4A:
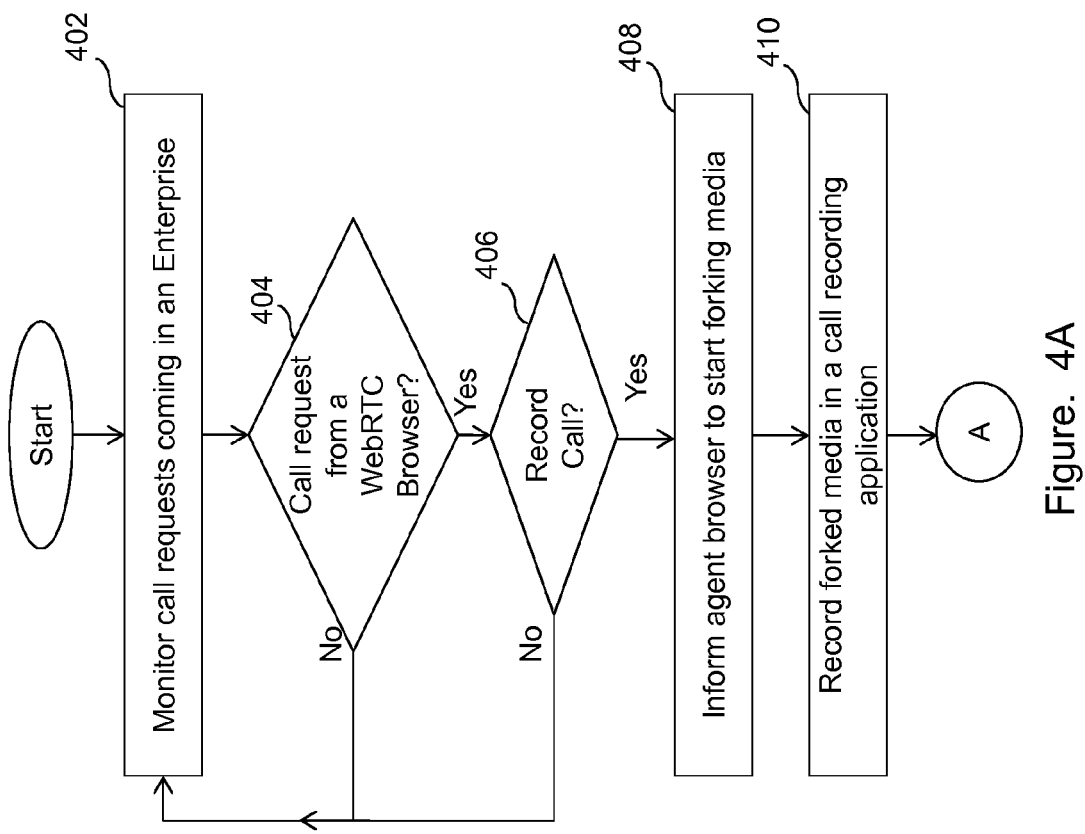
FIGS. 4A and 4B are a flowchart depicting an embodiment of the present invention.
Figure 4B:
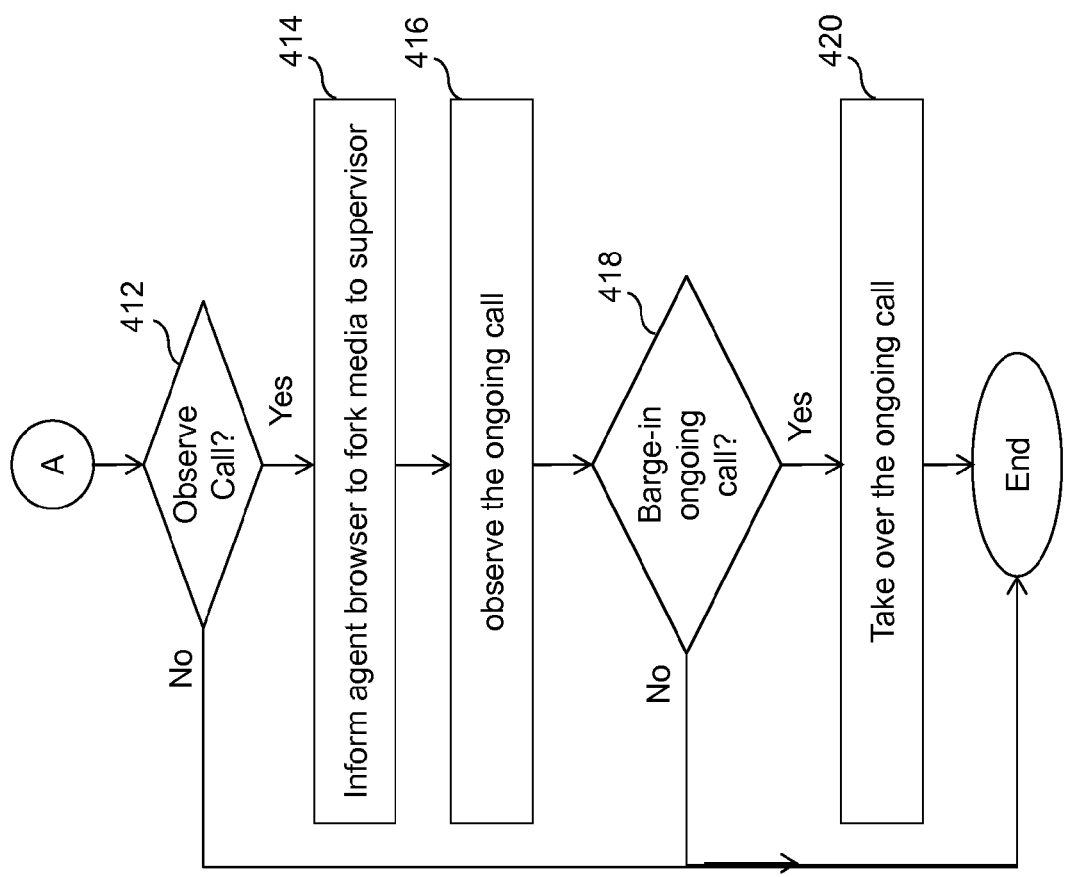

FIGS. 4A and 4B illustrates a flowchart depicting an embodiment of the present invention.

At step 402, the call center 100 monitors call request coming from customers. In an embodiment of the present invention, the call request to an agent of the call center 100 may be raised by using a personal computer, laptop, PDA, or Smartphone. In another embodiment of the present invention, the type of call may include a voice conversation, textual conversation, emails, or instant messaging. In yet another embodiment of the present invention, the customer call request may be made by a WebRTC enabled browser.

At step 404, it is determined whether the call request is made through a WebRTC enabled browser from customers outside the call center. If the call request raised by the customer is through WebRTC enabled browser, the method proceeds towards step 406.

At step 406, it is determined whether to record or not the ongoing call. In an embodiment of the present invention, the supervisor of the agent may determine and provide a command that the ongoing call is to be recorded or not. If the call is not recorded, then the method concludes.

If the supervisor of the agent determines to record the call, the method proceeds towards step 408. At step 408, the media of the ongoing established call is forked. In an embodiment of the present invention, the media of the ongoing call may include voice data, or video data. In another embodiment of the present invention, the agent browser at agent's desktop may be used to fork the media. In an embodiment of the present invention, the agent browser may fork signalling, call offers, or media. The media fork may contain an offer that identifies supervisor's URI and a media stack. The agent browser forks the media to the supervisor's URI.

At step 410, the forked media is recorded. The agent browser may start forking the media call towards a call recording application. In another embodiment of the present invention, the forked media is passed to the supervisor of the call center. The supervisor of the call center 100 observes and listens to the ongoing call between the customer and the agent and may record the ongoing call in the call recording application.

In an embodiment of the present invention, for recording the media, the media fork contains an offer, but the URI of the supervisor is chosen by the call recording application to act as media sink for the ongoing session. The agent browser then sends two streams, i.e., incoming customer Real time Transfer Protocol (RTP), and outgoing agent RTP to an Appointment management System (AMS). In this case, the agent of the call center forks two streams of the customer and the agent RTP that may be recorded separately for this call ID. In an embodiment of the present invention, the media fork for call recording may go to the customer and agent browser separately, and then AMS may get the same media but from two different hosts. In one embodiment, the recording of the call may be done in .wav format.

At step 412, it is determined whether to observe the call or not. If the call is not to be observed by the supervisor the method concludes.

If the call is to be observed by the supervisor of the contact center, the method proceeds towards step 414. At step 414, the incoming media is forked. Further, the supervisor of the call center may send a 'media fork' command to fork the incoming media. In an embodiment of the present invention, the supervisor may have a bunch of icons indicating status of the agents on supervisor's browser. For example, a green icon associated with the agent's name indicates that the agent is in an ongoing session while yellow icon indicates that the agent is not talking to anybody at that time. When the supervisor clicks on the green icon, the web server sends a 'media fork' command to both the customer and the agent browsers to fork the media stream to the supervisor 'X'.

At step 416, the supervisor of the agent may observe the ongoing call. In an embodiment of the present invention, the agent of the call center 100 posts a POST command to the web server 124 to elect the supervisor to observe and listen to the ongoing call.

In an embodiment of the present invention, the web server may also inform the agent browser to fork the identity of the supervisor's browser, and then on sort of an ADHOC basis, the supervisor may start listening to the ongoing conversation. In another embodiment of the present invention, the supervisor may record the conversation while observing the ongoing session.

At step 418, the supervisor determines whether to barge in the ongoing call. If the ongoing call is going really well, the supervisor may not barge-in the call and the call may continue with the agent of the call center 100 and the method concludes.

If the session is not going really well, the supervisor may barge-in and instruct the agent on agent's browser to stop sending media to the customer and substitute supervisor's media to the customer.

At step 420, if the agent of the call center is failed to handle the call, then the supervisor of the call center may hook into that call, and may take the call away from that agent. In yet another embodiment, the call may be directly transferred to the supervisor of the call center. In an embodiment of the present invention, a call transferring module (not shown in the figure) may transfer the call to the supervisor of the call center.

In yet another embodiment of the present invention, the supervisor may also interfere in the call if the call is going really well. This may be done to observe the call by the supervisor and record the ongoing call.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a WebRTC browser, and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A call recording system for recording calls in an enterprise, comprising:
    a monitor module configured to monitor and detect at least one request to establish a Web Real-Time Communication (WebRTC) call with an agent of the enterprise;
    a fork module configured to fork media streams associated with the at least one WebRTC call, wherein the forking is initiated from a WebRTC enabled browser of the agent or a user outside the enterprise; and
    a record module configured to record the forked media streams to record the at least one WebRTC call.

2. The call recording system of claim 1, wherein the at least one WebRTC call is between the WebRTC enabled browser of the user outside the enterprise and the WebRTC enabled browser of the agent of the enterprise.

3. The call recording system of claim 1, wherein the fork module forks media streams based on connection of the WebRTC call between a user and the agent.

4. The call recording system of claim 1, further comprising an observe module configured to enable a supervisor to observe proceeding of the at least one WebRTC call.

5. The call recording system of claim 4, wherein the fork module is configured to further fork the media streams associated with the at least one WebRTC call to enable the supervisor to observe proceeding the WebRTC call between a user and the agent.

6. The call recording system of claim 1, further comprising a barge module configured to enable a supervisor to barge into the at least one WebRTC call.

7. The call recording system of claim 1, wherein the supervisor barges into the at least one WebRTC call based on proceedings of the WebRTC call.

8. The call recording system of claim 1, wherein the fork module configured to fork the media streams associated with the at least one WebRTC call based upon approval from a supervisor.

9. The call recording system of claim 1, wherein fork module automatically forking the media streams associated with the at least one WebRTC call.

10. The call recording system of claim 1, wherein the fork module further configured to separately fork media streams coming from the agent's browser and the user's browser.

11. The call recording system of claim 10, wherein the record module separately recording the media streams coming from the agent's browser and the user's browser.

12. The call recording system of claim 1, wherein capacity of the call recording system is dependent upon number of agents in the enterprise.

13. A computer-implemented method for recording calls in an enterprise, the computer-implemented method comprising:
    monitoring incoming call requests in an enterprise to detect at least one request to establish a Web Real-Time Communication (WebRTC) call with an agent of the enterprise;
    forking media streams associated with the at least one WebRTC call, wherein the forking is initiated from a WebRTC enabled browser of the agent or a user outside the enterprise; and
    recording the forked media streams to record the at least one WebRTC call.

14. The computer-implemented method of claim 13, wherein the at least one WebRTC call is between the WebRTC enabled browser of the user outside the enterprise and the WebRTC enabled browser of the agent of the enterprise.

15. The computer-implemented method of claim 13, wherein the forking comprises forking media streams based on connection of the WebRTC call between a user and the agent.

16. The computer-implemented method of claim 13, further comprising observing proceeding of the call.

17. The computer-implemented method of claim 13, further comprising barging into the at least one WebRTC call.

18. The computer-implemented method of claim 13, further comprising barging comprises barging into the at least one WebRTC call based on proceeding of the WebRTC call.

19. The computer-implemented method of claim 13, wherein the forking comprises forking separately media streams coming from the agent's browser and the user's browser.

20. A tangible computer readable medium storing computer readable instructions when executed by a processor perform a method comprising:
- monitoring incoming call requests in an enterprise to detect at least one request to establish a Web Real-Time Communication (WebRTC) call with an agent of the enterprise;
- forking media streams associated with the at least one WebRTC call, wherein the forking is initiated from a WebRTC enabled browser of the agent or a user outside the enterprise; and
- recording the forked media streams to record the at least one WebRTC call.

* * * * *